United States Patent
Shu et al.

(10) Patent No.: US 7,802,019 B2
(45) Date of Patent: Sep. 21, 2010

(54) HARD DISK DRIVE CONDITION REPORTING AND ERROR CORRECTION

(75) Inventors: Frank J. Shu, Portland, OR (US); Nathan S. Obr, Bellevue, WA (US); Yi Meng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 456 days.

(21) Appl. No.: 11/297,269

(22) Filed: Dec. 8, 2005

(65) Prior Publication Data
US 2006/0282709 A1 Dec. 14, 2006

Related U.S. Application Data

(60) Provisional application No. 60/690,549, filed on Jun. 14, 2005.

(51) Int. Cl.
G06F 3/00 (2006.01)
G06F 11/00 (2006.01)
(52) U.S. Cl. .......................................... 710/8; 714/100
(58) Field of Classification Search ....................... 710/8
See application file for complete search history.

(56) References Cited

U.S. PATENT DOCUMENTS

| | | | |
|---|---|---|---|
| 5,914,967 A | 6/1999 | Yomtoubian | |
| 6,316,988 B1 * | 11/2001 | Forehand et al. | 327/538 |
| 6,493,656 B1 | 12/2002 | Houston et al. | |
| 6,535,998 B1 | 3/2003 | Cabrera et al. | |
| 6,600,614 B2 | 7/2003 | Lenny et al. | |
| 6,760,869 B2 | 7/2004 | Lam | |
| 6,785,695 B1 | 8/2004 | Hamilton, II et al. | |
| 6,922,754 B2 | 7/2005 | Liu et al. | |
| 6,950,255 B2 | 9/2005 | Imai | |
| 6,970,972 B2 | 11/2005 | Hosoya | |
| 7,089,445 B2 | 8/2006 | Kaiya et al. | |
| 2002/0144025 A1 * | 10/2002 | Poisner et al. | 710/15 |
| 2003/0097485 A1 * | 5/2003 | Horvitz et al. | 709/313 |
| 2004/0064631 A1 * | 4/2004 | Kishon et al. | 711/100 |
| 2004/0128587 A1 | 7/2004 | Kenchammana-Hosekote et al. | |
| 2005/0188269 A1 * | 8/2005 | El-Shimi et al. | 714/38 |
| 2005/0193284 A1 * | 9/2005 | Yasuo | 714/48 |
| 2005/0216800 A1 * | 9/2005 | Bicknell et al. | 714/718 |
| 2005/0262385 A1 | 11/2005 | McNeill et al. | |
| 2006/0014562 A1 * | 1/2006 | Syrtsov et al. | 455/556.2 |

(Continued)

OTHER PUBLICATIONS

Gary Herbst, Hitachi's Drive Temperature Indicator Processor (Drive-TIP) helps ensure high drive reliability, Jun. 8, 2004, pp. 1-6.*

(Continued)

Primary Examiner—Alford W Kindred
Assistant Examiner—Brooke J Dews
(74) Attorney, Agent, or Firm—Wolf, Greenfield & Sacks, P.C.

(57) ABSTRACT

A system that facilitates maintaining hard disk drive performance comprises a memory component that includes extensions to at least one protocol associated with a hard disk drive, the extensions enable communications to occur in real-time between an operating system and the hard disk drive. An interface component utilizes the extensions to receive a notification from the hard disk drive and relay the notification to the operating system, the notification relates to an operating parameter of the hard disk drive.

20 Claims, 13 Drawing Sheets

U.S. PATENT DOCUMENTS

2006/0075288 A1    4/2006  Forrer et al.
2006/0195904 A1*   8/2006  Williams ..................... 726/24
2006/0248236 A1*  11/2006  Ahmed et al. ................. 710/5
2006/0253674 A1*  11/2006  Zohar et al. ................ 711/165

OTHER PUBLICATIONS

The PC Guide, Self-Monitoring Analysis and Reporting Technology (SMART), Apr. 17, 2001, pp. 1-3.*

Bruce Allen. Monitoring Hard Disks with SMART. http://delivery.acm.org/10.1145/960000/959345/6983.html?key1=959345&key2=8575925611&coll=GUIDE&dl=GUIDE&CFID=8077542&CFTOKEN=68261050. Last accessed Dec. 5, 2006.

Sandeep Shah, et al. Reliability Analysis of Disk Drive Failure Mechanisms. http://ieeexplore.ieee.org/iel5/9660/30517/01408366.pdf?isNumber=. Last accessed Dec. 5, 2006. pp. 226-231.

Satoshi Asami, et al. Designing a Self-Maintaining Storage System. http://coblitz.codeen.org:3125/citeseer.ist.psu.edu/cache/papers/cs/4896/http:zSzzSznow.cs.berkeley.eduzSzTdzSzPaperszSzselfMaintain.pdf/asami99designing.pdf. LAst accessed Dec. 5, 2006.

Kimberly Keeton, et al. Automating data dependability. http://delivery.acm.org/10.1145/1140000/1133391/p93-keeton.pdf?key1=1133391&key2=3938925611&coll=GUIDE&dl=GUIDE&CFID=8081173&CFTOKEN=47967464. Last accessed Dec. 5, 2006. pp. 93-100.

* cited by examiner

HARD DISK DRIVE CONDITION REPORTING AND ERROR CORRECTION

CROSS REFERENCE TO RELATED APPLICATION

This application claims the benefit of U.S. Provisional Patent Application Ser. No. 60/690,549, filed on Jun. 14, 2005, and entitled HARD DISK DRIVE REAL-TIME CONDITION REPORTING AND ERROR CORRECTION. The entirety of this application is incorporated herein by reference.

BACKGROUND

Hard disk drives are the primary computer storage device in most computing systems. Maintaining a hard disk drive's proper working environment is critical for preventing a hard disk drive from failing. For example, excessive vibration during hard disk drive operation can cause the read/write head to contact the magnetic disk, scratching the disk surface and damaging the hard disk drive. In addition, sudden changes in temperature and humidity may cause condensation inside the hard disk drive. The condensation may cause the read/write head to adhere to the surface of the disk and prevent the disk from rotating.

Even under optimal conditions, hard disk drives may eventually fail. It is usually simply a question of when the hard disk drive will fail and what impact the failure will have on the computing environment in which the hard disk drive is operating. To minimize loss of data in case of hard disk drive failure, the data on a hard disk drive may be copied or "backed up" to other computer storage media. Generally, businesses and large computer networks have established procedures for copying data from their hard disk drives to a separate storage medium on a periodic basis. Consequently, when a hard disk drive is working correctly and data is copied periodically, a computer or network may spend valuable time copying data from a hard disk drive unnecessarily. Moreover, many individuals and small networks do not make copies of the data on their hard disk drives on a regular basis, if at all. If the hard disk drive data has not been copied for a long period of time prior to a hard disk drive failure, the computer or network may lose valuable data. Restoring or recreating lost data may be expensive, time-consuming and, depending upon the nature of the data, potentially devastating to an individual or business.

As hard disk drives have increased in recording density and data output rate, hard disk drive manufacturers have also increased the sophistication of the hard disk drive to increase performance and mean time between failures. Hard disk drives may include environmental sensors such as temperature, vibration, G-force sensors and the like. Hard disk drives may also detect and track hard disk drive performance including the error rate and the frequency with which the hard disk drive is powered on and off. An error rate, as used herein, is the ratio of the number of occurrences of erroneous data to the total number of units of data. A high error rate for a hard disk drive may indicate a problem with the read/write heads or damage to the magnetic medium. An increase in the error rate may indicate imminent hard disk drive failure.

Current hard disk drives have a limited mechanism to provide performance and configuration information to a host operating system. This is based at least in part upon the fact that hard disk drives are often associated with proprietary data packaging techniques, and manufacturers of hard disk drives do not wish to enable bi-directional communications to occur between hard disk drives and operating systems (for fear of reverse engineering of data packing techniques). Thus, today, hard disk drives receive commands for data from an operating system (e.g., through user-initiated commands) and accommodate such request by packaging data in a format that can be interpreted by the operating system. Today's hard disk drives do not provide information to an operating system without solicitation, as existing hard disk drive interface protocols such as the small computer system interface (SCSI), serial attached SCSI (SAS), parallel ATA (PATA) or serial ATA (SATA) fail to provide a method for communicating hard disk drive environment and performance conditions to an operating system. Currently, if a harmful condition occurs in the hard disk drive system, the hard disk drive has no way of informing the operating system of the harmful condition. Consequently, the operating system has almost no information regarding the performance conditions within the hard disk drive and no way to prevent hard disk drive failure when failure is imminent. As a result, an operating system will treat a hard disk drive as operating normally until the hard disk drive fails. The operating system is unable to act to correct the harmful condition, to mitigate possible damage and minimize the data loss or to alert users of the potential failure.

Current hard disk drives may collect error information for analysis in a post mortem fashion, but are unable to communicate such information (and performance information) to the host operating system. For example, a hard disk drive may have a temperature sensor indicating an abnormally high temperature, but be unable to react to the high temperature.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Hard disk drive failures can cause devastating loss of data. Sophisticated hard disk drives are likely to be capable of detecting many of the conditions that either cause or precede hard disk drive failure. Unfortunately, the hard drives may not be able to communicate this information to the operating system or users. The claimed subject matter is able to utilize detection of operating parameters associated with a hard disk drive to maintain performance of the hard disk drive, correct errors associated with the hard disk drive, and/or prevent failure or damage of the hard disk drive. This can be accomplished through employment of a newly created protocol or extensions to existing protocol(s) associated with hard disk drives. These protocols or extensions thereto enable notifications, sensed operating conditions and/or a policy that can correct a sensed problem and/or mitigate damage to the hard disk drive to be provided from the hard disk drive to the operating system. The operating system can then implement such policy to avoid or mitigate damage to the hard drive.

For example, one or more sensors associated with a hard disk drive can measure operating parameters associated with the hard disk drive, such as temperature, G force, vibration, humidity, duty cycle information, error rate, read speed, write speed, and the like. If one or more of these sensed parameters lies outside an acceptable range, the hard disk drive can analyze such data and determine an appropriate action to be undertaken by a host (e.g., an operating system). If the hard disk drive determines that an action by a host is desired, the hard disk drive can generate a notification that is to be transmitted to the operating system, indicating to the operating system that the hard disk drives recommends undertaking of a corrective/maintenance action. If the hard disk drive is capable of asynchronous communication, the notification can be automatically provided to the operating system upon creation thereof. Alternatively, if the hard disk drive is not capable of asynchronous communication, the notification can be created and at least temporarily retained at a particular location of the hard disk drive. The operating system can then periodically poll that location to determine whether there is an existing notification. If there is an existing notification, then such notification can be retrieved from the hard disk drive by the operating system. The notification can be lightweight (e.g., no significant payload) so that such notification can be quickly transmitted from the hard disk drive to the operating system.

Upon receiving the notification, the operating system can automatically generate one or more commands in order to retrieve additional data and/or policies to be effectuated from the hard disk drive. For instance, a sensor associated with the hard disk drive can determine that a temperature lies outside a threshold range, and the hard disk drive can analyze the sensed parameters and determine an action to be undertaken (e.g., that a fan should be turned on, operation speed should be reduced, . . . ). The hard disk drive can then generate a notification to the operating system, wherein the notification indicates that the hard disk drive wants the operating system to undertake the determined action. The operating system can then retrieve a policy or action from the hard disk drive (e.g., commands for performing an action), and the operating system can then undertake such action. For instance, the hard disk drive can inform the operating system that a fan should be turned on, that a backup should be undertaken, or other suitable action. Policies provided by the operating system from the hard disk drive can be based at least in part upon predefined policies associated with the operating system. These policies can be provided by a user, pre-packaged with a computing device or operating system, downloaded from a network, altered by a user, and/or provided through removable media. The above-described and other communications can occur between the operating system and the hard disk drive in real-time, and can aid in lengthening usable life of hard disk drives, correcting errors associated with hard disk drives, and preventing failure of hard disk drives.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
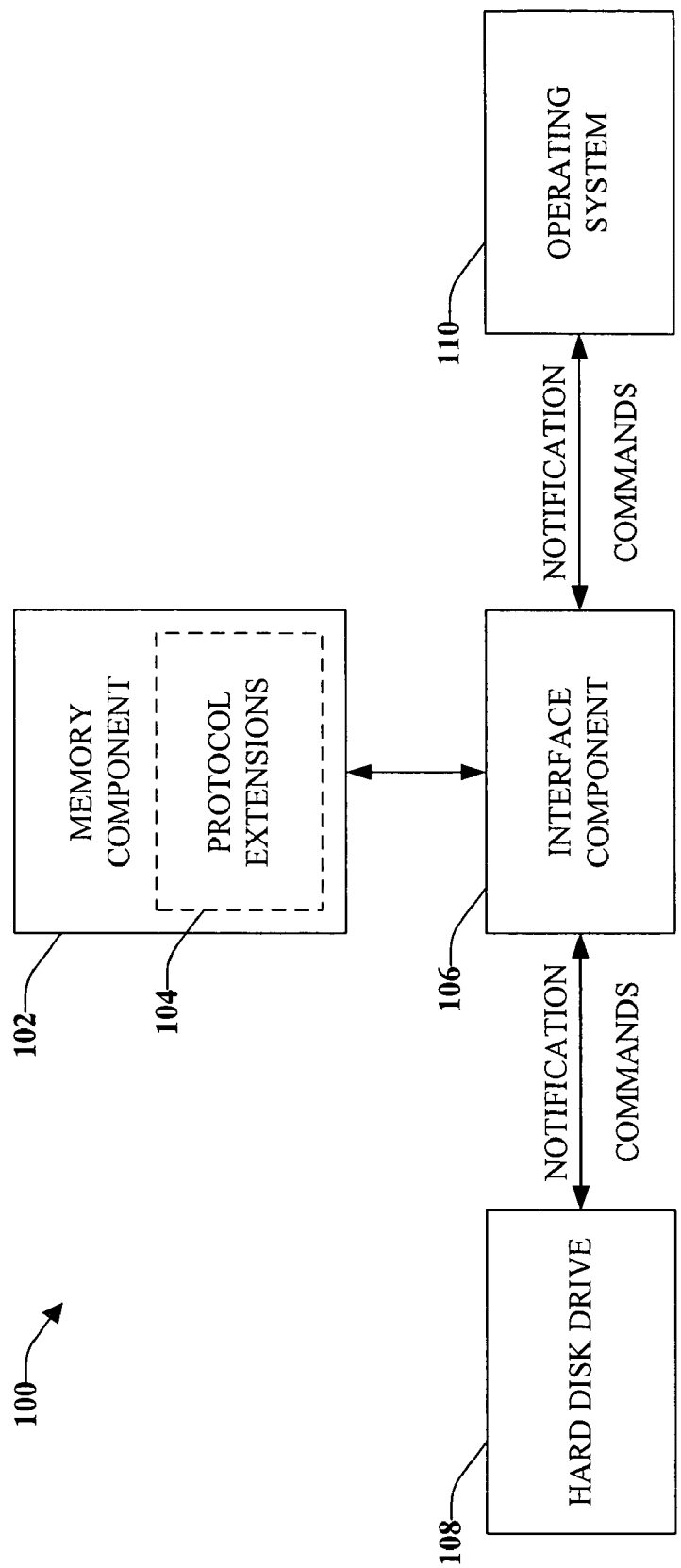
FIG. 1 is a high level block diagram of a system for monitoring hard disk drive operating parameters and performing an action at an operating system based thereon.

The subject invention is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

The word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that facilitates monitoring hard disk drive performance and determining an action to undertake based upon such monitoring. The system 100 includes a memory component 102 that includes protocol extensions 104 that enable communications to occur between operating systems and hard disk drives associated therewith. The protocol extensions 104 can, for example, depend upon a type of hard disk drive as well as a type of operating system. In still more detail, the protocol extensions 104 can be associated with existing protocols utilized in connection with receipt and/or transmission of data to/from a hard disk drive, such as SCSI, SAS, PATA, SATA, or other suitable protocols. Support for the protocol extensions 104 can be pre-packaged with a computing device or hard drive, placed upon a computing device by way of a removable medium (e.g., a CD, a DVD, flash card, . . . ), and/or pre-packaged with an operating system. In another example, an entirely new protocol can be created that enables communications to occur between hard disk drives and operating systems, and such protocol can be retained within the memory component 102.

The system 100 further includes an interface component 106 that utilizes the protocol extensions 104 to effectuate data transmission between a hard disk drive 108 and an operating system 110 upon a computing device (which can be a server, a laptop computer, a desktop computer, a personal digital assistant, or any other suitable computing device). For instance, hard disk drives can be sophisticated in the sense that they can self-monitor a plurality of parameters associated therewith. These parameters can include temperature, vibration, G force, humidity, read speed, write speed, power on time, error rate, power on frequency, duty cycle information, number of reads or writes undertaken by a read/write head, or any other suitable parameters that may be associated with the hard disk drive 108. As used herein, the duty cycle of a device is the ratio of the time during which the device is in operation to the time the device is powered off or cooling down. Manufacturers may limit a device's rated capacity to continuously perform work under normal conditions. For example, a hard disk drive with an 80% duty cycle rating is capable of running 80% of a specified time period and should be turned off or cooled down for the remainder of the time period. Operating a hard disk drive above the rated duty cycle may damage the hard disk drive, leading to hard disk drive failure and voiding the manufacturer's warranty.

Conventionally, hard disk drives and operating systems coordinate with one another in an extremely limited manner. For instance, operating systems can receive commands from a user to retrieve and display a particular file stored within a hard disk drive. If performance issues arise that may be associated with hard disk drive failure, an operating system will not be able to undertake action as the hard disk drive has no mechanism for instructing the operating system of a preventative maintenance action and/or a corrective action. With respect to duty cycle, if the hard disk drive is operating at or above a duty cycle rating associated therewith, a warranty may be voided and damage can occur. The hard disk drive, however, even though it can sense that operation is above the duty cycle rating, has no way of informing the operating system of such operation.

The interface component 106 enables communications relating to an operating parameter and/or a performance parameter to occur between the hard disk drive 108 and the operating system 110 through employment of the protocol extensions 104 and/or software that supports such extensions 104. For example, a sensor within the hard disk drive 108 can detect that a temperature associated with such drive 108 is abnormal, and can further determine that a cooling fan should be turned on and/or that operation speed should be slowed. The hard disk drive 108 can then generate a notification, which can be relayed to the operating system 110 by way of the interface component 106 (which employs the protocol extensions 104). The notification created by the hard disk drive 108 may be lightweight in nature, enabling such notification to be quickly transferred from the hard disk drive 108 to the operating system 110 (or a particular component associated therewith). Content of the notification may include a code that generally indicates a problem associated with the hard disk drive 108. For instance, the code can be a plurality of bits, wherein a certain combination of bits may indicate that a temperature lies outside of an expected range. Similarly, a disparate combination of bits can indicate that an inordinate amount of vibration is occurring with respect to the hard disk drive 108. In another example, the notification can utilized to cause the operating system 110 (or other similar host) to request additional information from the hard disk drive 108.

Upon receipt of the notification, the operating system 110 can automatically (without user input) generate commands that are provided to the hard disk drive 108 by way of the interface component 106. The commands can be designed to retrieve an action from the hard disk drive 108 that is to be undertaken by the operating system 110. For instance, upon receipt of the notification, the operating system 110 can request data from the hard disk drive 108, wherein such data includes an action to be undertaken by the operating system 110. Thus, if the hard disk drive 108 determines that a cooling fan should be turned on it can generate a notification and provide it to the operating system 110. The operating system 110 can then request additional data from the hard disk drive 108, and the hard disk drive 108 can comply by informing the operating system 110 that the cooling fan should be turned on. The operating system 110 then acts according to the hard disk drive's commands.

Figure 2:
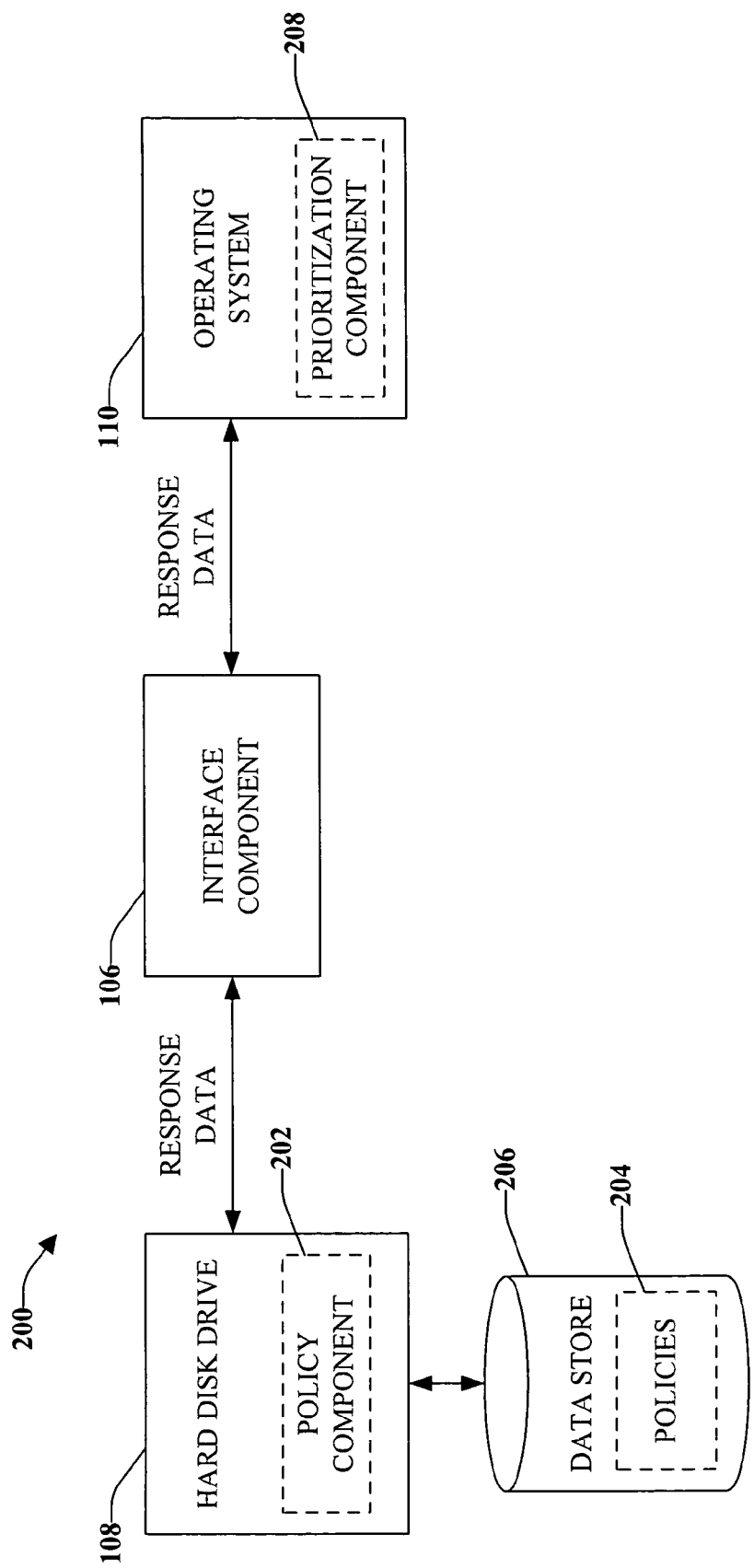
FIG. 2 is a high level block diagram of a system for undertaking a corrective action with respect to a hard disk drive based upon predefined policy.

Now turning to FIG. 2, a system 200 that enables performance of an action to prevent or mitigate damage to a hard disk drive is illustrated. The system 200 includes the interface component 106 that enables communications to occur in real time between the hard disk drive 108 and the operating system 110. As described above in connection with FIG. 1, the hard disk drive 108 can include various environmental sensors, and a notification can be created and provided to the operating system 110 by way of the interface component 106 based upon at least one sensed parameter. The operating system 110 can receive the notification and respond with commands that are employed to effectuate obtainment of an action that the hard disk drive 108 has determined should be undertaken by the operating system 110.

The hard disk drive 108 can include a policy component 202 that analyzes parameters obtained through one or more sensors to determine an appropriate action to be undertaken by the operating system 110 based at least in part upon the analysis. Upon determining a desirable policy to be undertaken, the policy component 202 can select the desirable policy from a plurality of policies 204 that are resident within a data store 206 (which may be within and/or separate from the hard disk drive 108). Policies that can be implemented by the operating system 110 may be user-defined. For instance, the hard disk drive 108 and/or the operating system 110 can be associated with a wizard that aids a user in connection with defining policy (e.g., actions to be undertaken given certain sensed parameters). The wizard can solicit data from a user by presenting the user with questions and enabling the user to provide responses and/or additional data through radio buttons, pull-down menus, selectable buttons, data fields, and/or other suitable mechanisms. Upon completion of the wizard, the policy component 202 can be associated with one or more user-defined policies that are to be implemented given certain sensed parameters. Additionally or alternatively, policies implemented by the policy component 202 can be pre-packaged with the hard disk drive 108. For instance, regardless of user desires, given a particular temperature associated with the hard disk drive 108 it may be desirable to power off the hard disk drive 108. Further, policies that can be implemented by the policy component 202 may be downloaded from the Internet (or other suitable data repository) and/or associated with the hard disk drive 108 by way of a removable medium, through a communication link with a disparate device, or any other suitable manner for obtaining policies.

The operating system 110 can further include a prioritization component 208 that determines an action to be undertaken by the operating system 110 given current context associated with the operating system 110 and the action received from the hard disk drive 108. For instance, the prioritization component 208 can determine that the operating system 110 is currently performing a save function with respect to a large file, and that it is not desirable to interrupt such save given a particular action by the hard disk drive 108. In a more detailed example, if the hard disk drive 108 informs the operating system 110 that a coolant fan should be turned on because the temperature lies outside a temperature range (although it is close to an acceptable temperature range) the prioritization component 208 can cause the operating system 110 to complete one or more other tasks prior to the policy component 202 implementing the action.

Figure 3:
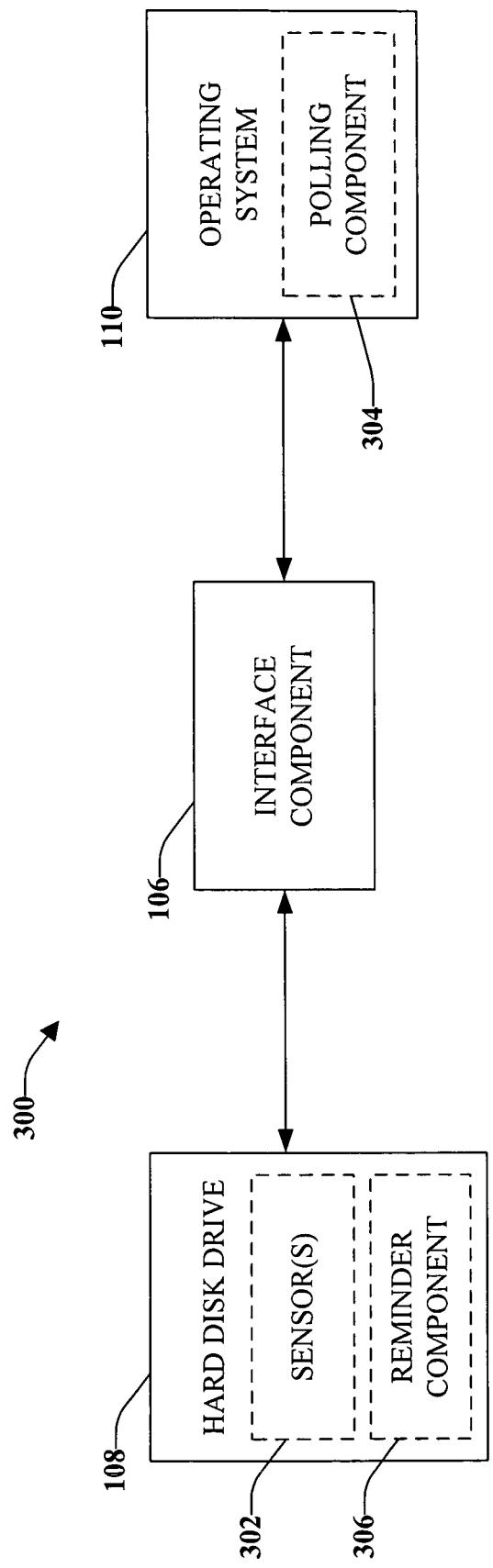
FIG. 3 illustrates a system for polling a hard disk drive for notifications relating to hard disk drive operation and undertaking an action upon receipt of the notification.

Referring now to FIG. 3, a system 300 that facilitates communications between hard disk drives and operating systems in a computing environment is illustrated. The system 300 includes the interface component 106, which enables the hard disk drive 108 and the operating system 110 to communicate with one another in real-time. For example, the interface component 106 can employ extensions to existing protocols to enable the hard disk drive 108 and the operating system 110 to communicate with one another in real-time. The hard disk drive 108 can include one or more sensors 302 that can sense parameters associated with the hard disk drive 108, such as duty cycle information, power on time, power on frequency, temperature, vibration, G force, read speed, write speed, error rate, and any other suitable parameters. Based upon such sensed parameters, the hard disk drive 108 can determine an action that is desirably undertaken by the operating system, and can generate a notification informing the operating system 110 that the hard disk drive 108 has determined that an action should be taken. Some hard disk drives, however, due to structure or other issues, may be unable to automatically cause delivery of a notification to the operating system 110. Accordingly, the operating system 110 can include a polling component 304 that periodically analyzes the hard disk drive 108 to determine if a notification has been generated. If a notification exists, the operating system 110 can request such notification and receive the notification by way of the interface component 106. The operating system 110 can then automatically generate additional commands (e.g., requests for data) and provide them to the hard disk drive 108 through the interface component 106. The commands can be serviced at the hard disk drive 108, resulting in the operating system 110 receiving the determined action by way of the interface component 106. The operating system 110 can then perform the action provided by the hard disk drive 108.

In some instances, the operating system 110 will not act immediately upon receipt of the notification, whether it was received through polling or automatically provided by the hard disk drive 108. For example, the operating system 110 may not recognize the notification and therefore may not act upon receipt of such notification. Accordingly, the hard disk drive 108 can include a reminder component 306 that re-sends the notification (or again makes the notification available to the polling component 304) after a threshold amount of time has passed. Thus, the reminder component 306 ensures that the operating system 110 will act upon an issue with the hard disk drive 108 within a reasonable period of time.

Figure 4:
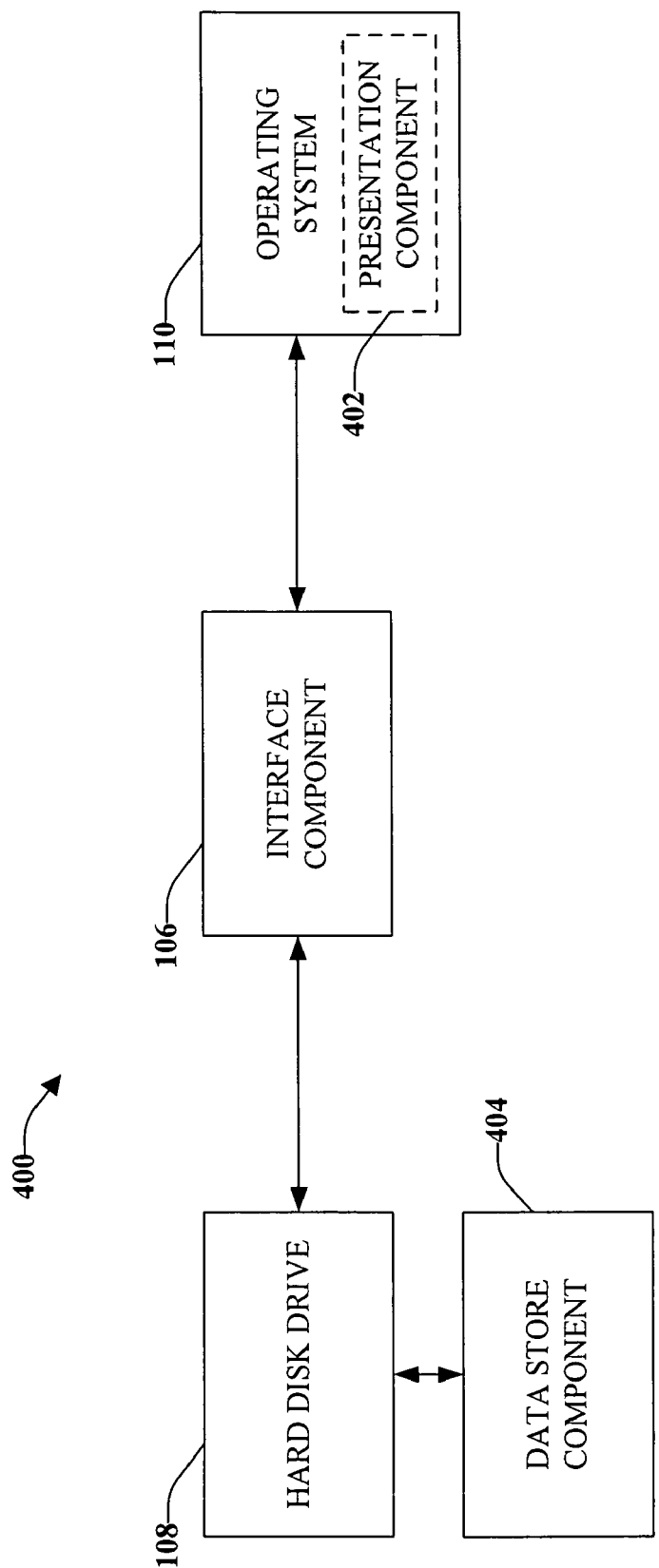
FIG. 4 illustrates a system that facilitates presentation of an alert to a user upon receiving a notification from a hard disk drive.

Now turning to FIG. 4, a system 400 that facilitates informing users of issues relating to hard disk drives is illustrated. The system 400 includes the interface component 106, the hard disk drive 108, and the operating system 110, which can all function in manners described above. The operating system 110 can include a presentation component 402 that presents information to a user that relates to a notification generated by the hard disk drive 108 and/or a policy or action determined by the hard disk drive 108 and communicated to the operating system 110. For instance, the hard disk drive 108 can generate a notification due to sensing of parameters relating to duty cycle and deliver such notification to the operating system 110 by way of the interface component 106. The operating system 110 can then automatically generate commands that are intended to retrieve a policy or action from the hard disk drive 108, and such commands can be provided to the hard disk drive 108 through the interface component 106. The hard disk drive 108 can service the commands and provide the requested policy or actoin to the operating system 110 (again by way of the interface component 106). The presentation component 402 can be privy to the exchange of notification(s), commands, and response data, and can provide a user with information relating thereto.

For instance, the presentation component 402 can generate a graphical user interface that can provide a user with information relating to the sensed parameters, the notification, and/or the policy or action determined by the hard disk drive 108. The information can be in the form of a warning and can provide the user with possible actions that may be undertaken to prevent loss of data and/or damage to the hard disk drive 108. For example, the presentation component 402 can generate a warning such as "temperature associated with your hard disk is too high—check fan." It can be discerned from this example that any suitable warning may be provided to users regarding a magnitude of possible operating parameters. Moreover, a graphical user interface created by the presentation component 402 can include selectable buttons that enable the user to select a particular action to be undertaken by the operating system 110. For instance, depression of a button (through utilization of a mouse, for example) provided on a graphical user interface created by the presentation component 402 can cause the operating system 110 to power down a computer. Furthermore, the presentation component 402 can relay information through a variety of means. For instance, the presentation component 502 can generate an email and deliver such email to the user, create an instant message and deliver such message to the user, etc.

The hard disk drive 108 can also be associated with a data store component 404, which can be within the hard disk drive 108 and/or external to the hard disk drive 108. The hard disk drive 108 can store performance information to the data store component 404 and analyze stored data when determining an action to undertake with respect to sensed parameters. The data store component 504 can be used to monitor and track hard disk drive performance over a period of time, such that a time-series analysis can be undertaken with respect to hard disk drive performance and/or error information. Based upon such analysis, the presentation component 502 can provide a user with particular information.

Referring now to FIGS. 5-10, methodologies relating to hard disk drive monitoring and correction are illustrated. While, for purposes of simplicity of explanation, the methodologies are shown and described as a series of acts, it is to be understood and appreciated that the methodologies are not limited by the order of acts, as some acts may, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology described herein.

Figure 5:
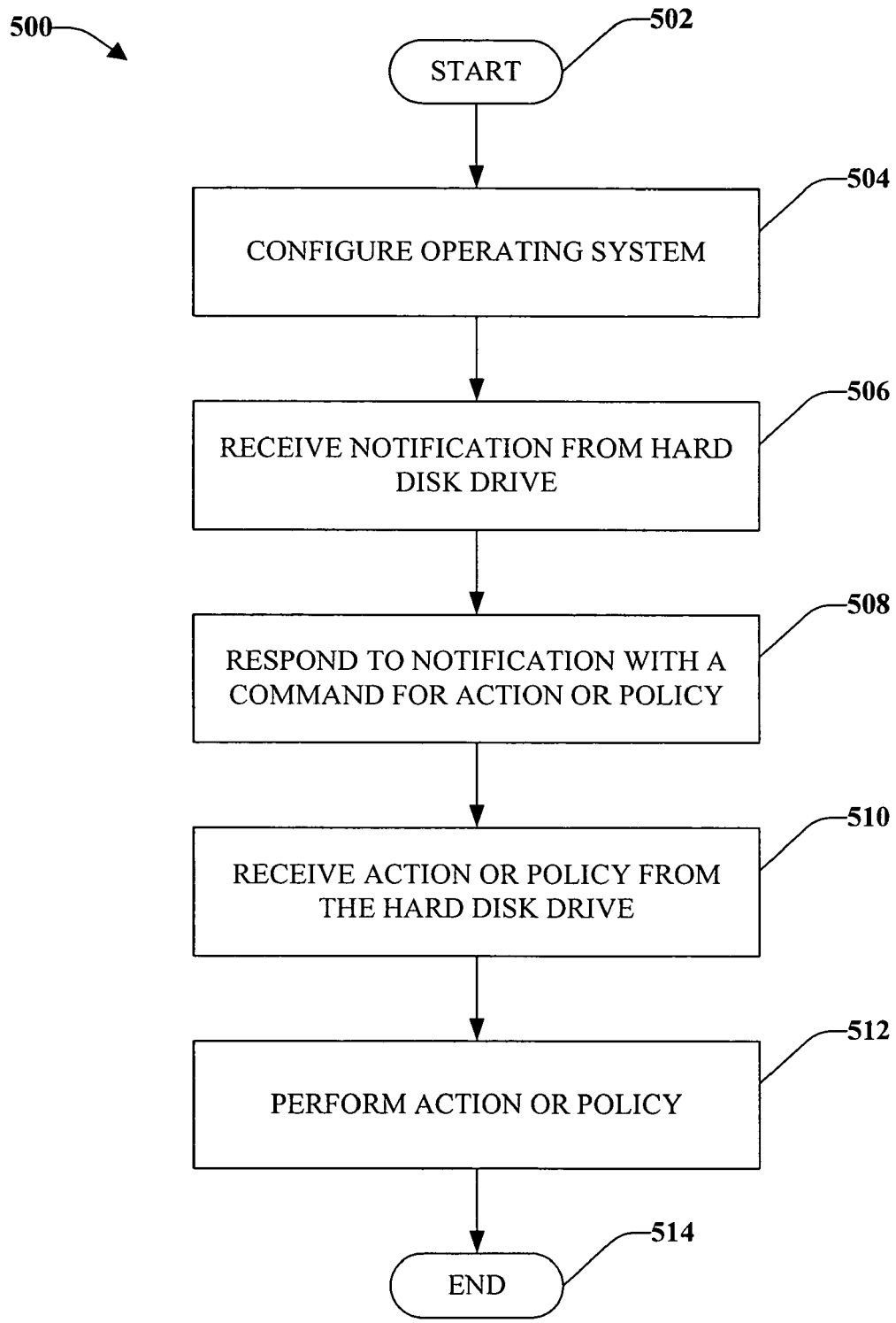
FIG. 5 is a representative flow diagram of a methodology for performing an action given a notification from a hard disk drive.

Turning specifically to FIG. 5, a methodology 500 for performing an action on with respect to a hard disk drive to maintain the hard disk drive and/or correct one or more errors associated with the hard disk drive is illustrated. The methodology 500 starts at 502, and at 504 an operating system is configured to receive a notification from a hard disk drive. To enable such configuration, extensions to existing protocols associated with hard disk drives can be associated with the operating system and/or the hard disk drive. These protocol extensions enable data to be exchanged (in real time) between the operating system and the hard disk drive. At 506, a notification is received at the operating system from the hard disk drive. The hard disk drive can include one or more sensors that can monitor various operating parameters associated with the hard disk drive, including temperature, vibration, G force, duty cycle information, etc. If a parameter lies outside an expected range, the hard disk drive can generate a notification, which is a lightweight message that can be quickly provided to the operating system. The hard disk drive can then initiate transmission of such data to the operating system. Alternatively, the operating system can periodically analyze a certain portion of the hard disk drive for a notification, and request such notification upon determined existence thereof.

At 508, the operating system can respond to the notification with command(s) for an action or policy that has been determined by the hard drive. For example, hard disk drives can be intelligent in that they can sense errors and/or problems associated with a hard disk drive, and can determine an action that is desirably undertaken. Conventionally, however, is no manner for communicating this information to operating systems or other hosts, as hard disk drive data formats are proprietary. The claimed subject matter, however, enables policies or actions determined by a hard drive to be provided to an operating system, which can then effectuate such policies or actions. At 510, the retrieved action or policy is received, and at 512 the operating system effectuates the actions or policies provided by the hard disk drive. For instance, the action can be a power down, generating a warning, backing up data in particular sectors of the hard disk drive, or any other suitable action that can be employed to maintain the hard disk drive and/or prevent damage from occurring to the hard disk drive. The methodology 500 completes at 514.

Figure 6:
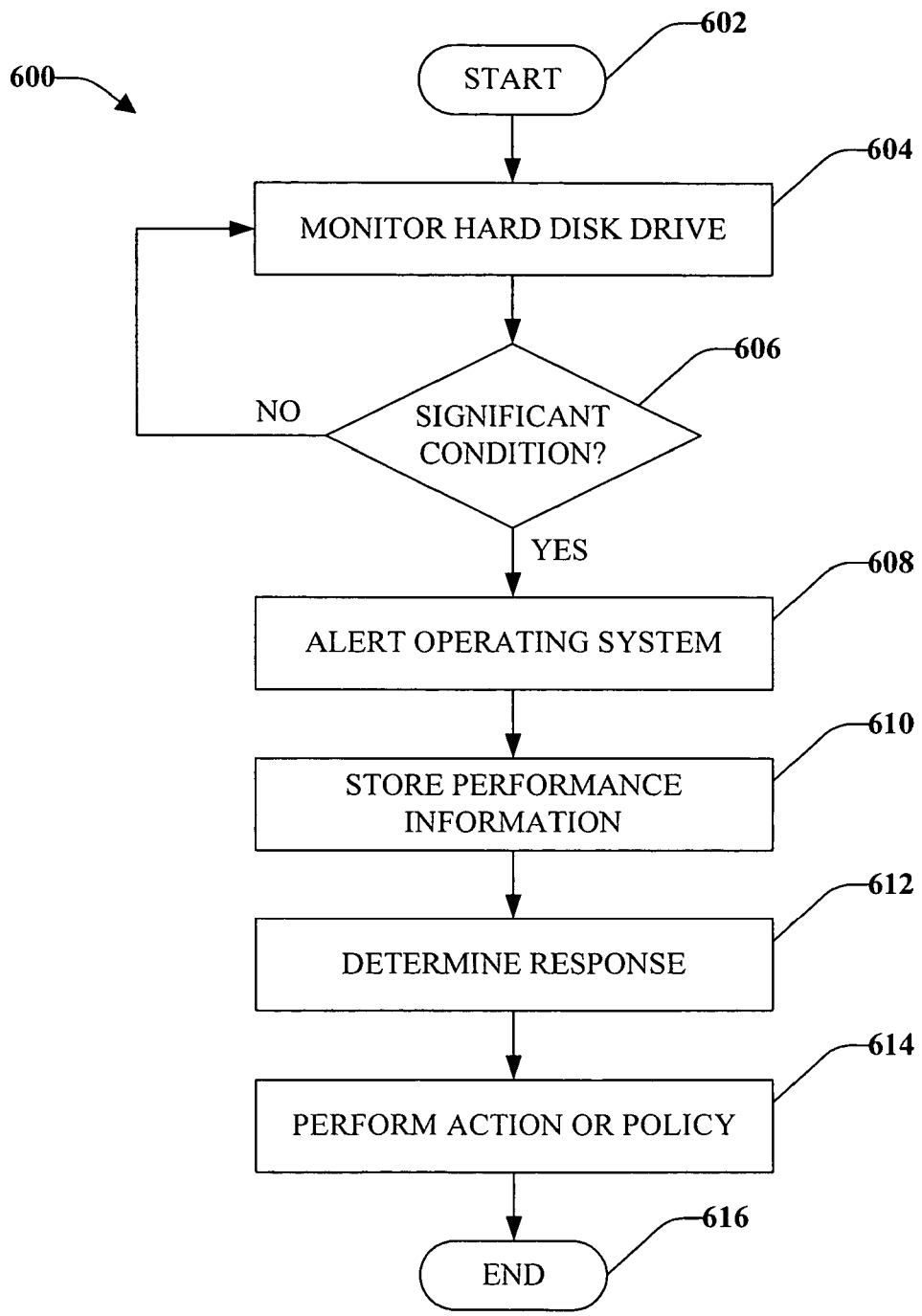
FIG. 6 is a representative flow diagram of a methodology for monitoring and correcting a hard disk drive through operating system action.

Referring now to FIG. 6, a methodology 600 for performing automatic maintenance on a hard disk drive is illustrated. The methodology begins at 602, and at 604 monitoring of hard disk drive status, performance and environmental conditions is performed using a variety of sensors and status indicators. At 606 a determination is made regarding whether a significant performance condition associated with the hard drive has been detected. Significant performance conditions, for example, can relate to error rates, duty cycles, temperature, vibrations and other sensor or status indicators outside of the normal operating parameters of the hard disk drive. If there is no significant performance condition detected, monitoring of the hard disk drive is continued at 604. If it is determined that a significant performance condition has been detected, an alert (e.g., notification) is sent to the operating system at 608. At 610, performance information is stored, for example, to a performance data storage unit. At 612, the hard disk drive analyzes sensed parameters and the performance information and determines an action or policy that is desired to be taken by the operating system. The operating system will effectuate the action or policy, and the methodology completes at 616.

Figure 7:
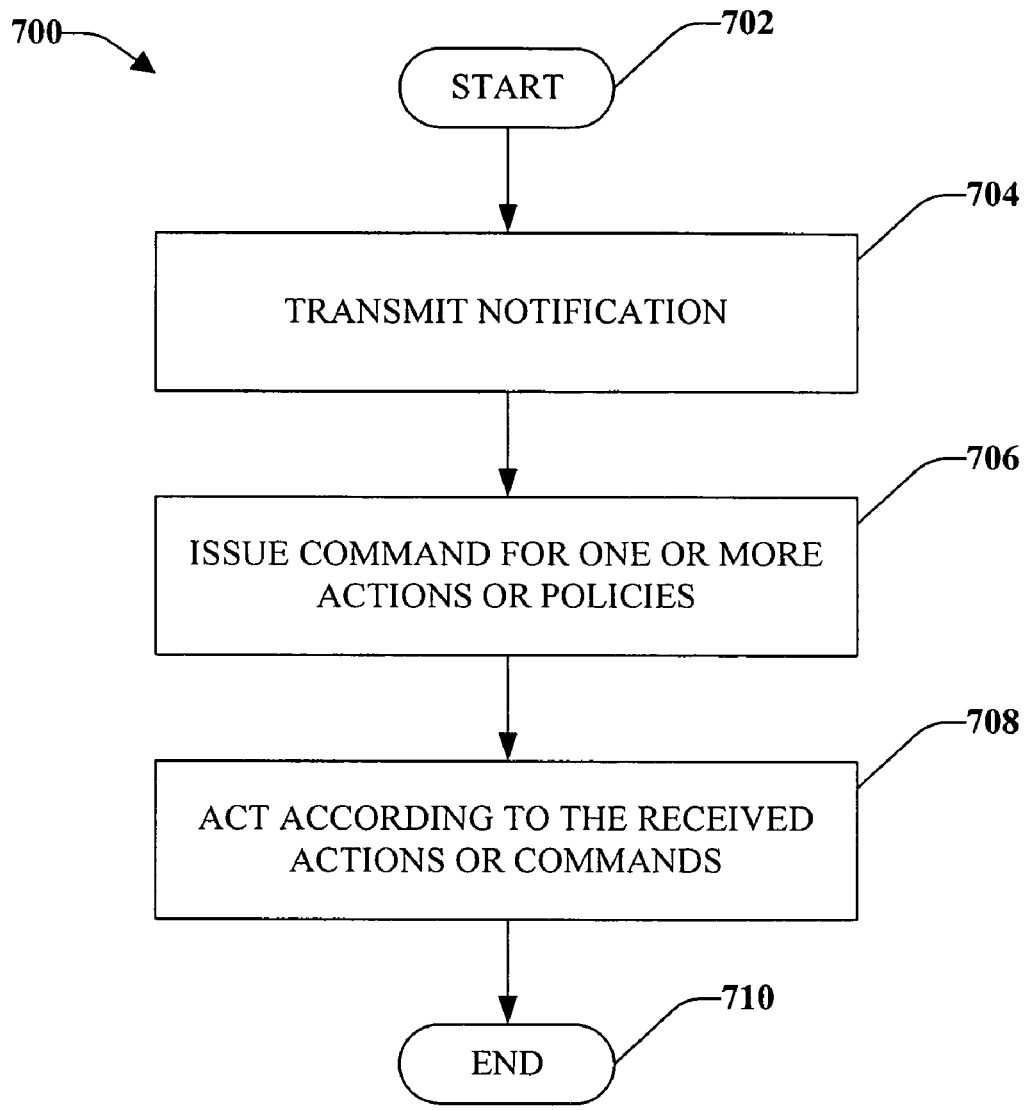
FIG. 7 is a representative flow diagram of a methodology for asynchronously transmitting a notification from a hard disk drive to an operating system.

FIG. 7 is a flow diagram 700 illustrating a methodology for an action or policy from a hard disk drive upon receipt of a notification. The methodology 700 starts at 702, and at 704, the hard disk drive generates and transmits a notification relating to at least one sensed operating parameter so long as the hard disk drive is associated with asynchronous communication capabilities. For instance, the notification may be a short, rapid message that alerts the operating system to a significant performance condition without providing detailed performance information (or it may include the detailed information). After receiving a notification, the operating system can continue processing other tasks before responding or can react immediately to the notification. Actions of the operating system undertaken at a time of received notification can depend upon current computing context as well as predefined policy. If the operating system takes no action, the hard disk drive can continue to transmit notifications until the significant condition is resolved, wherein frequency of deliverance of the notification can vary depending upon urgency of such notification. At 706, the operating system can request that the hard disk drive provide the operating system with one or more actions or policies to be undertaken. These actions or policies can be transferred by way of extensions to existing protocols associated with hard disk drives. After issuing the request, the operating system can act as proscribed by the hard disk drive at 708, and the methodology completes at 710.

Figure 8:
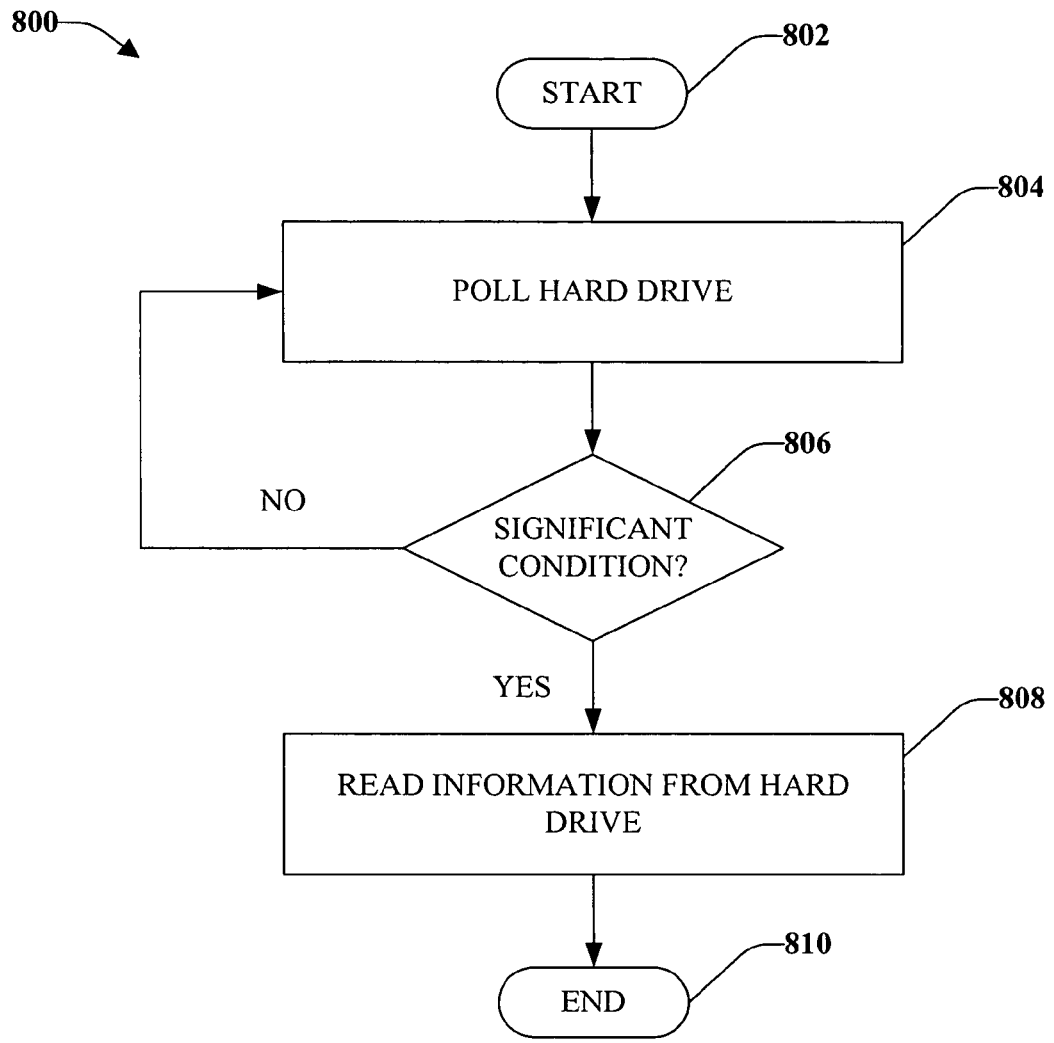
FIG. 8 is a representative flow diagram of a methodology for polling a hard disk drive to detect a notification relating to an operating parameter.

Now turning to FIG. 8, a methodology 800 for receiving one or more actions or policies from a hard disk drive upon receipt of a notification at an operating system is illustrated, wherein the hard disk drive is not associated with capabilities to effectuate asynchronous communications. For instance, certain interface protocols (e.g., PATA) do not provide for asynchronous communication from the hard disk drive to the operating system. Consequently, the hard disk drive is unable to send a notification to the operating system. The methodology 800 starts at 802, and at 804 the operating system polls the hard disk drive for a notification (or performance information). As used herein, polling is a technique for periodically interrogating a device to see if it has data to transfer. The operating system may poll the hard disk drive for a notification frequently enough to detect and correct error conditions before hard disk drive failure, but not so frequently as to slow the performance of the system. At 806, a determination is made regarding whether a notification has been detected (and thus whether a significant condition has occurred). If the operating system detects a notification, the operating system can generate commands to one or more actions or policies to be undertaken from the hard disk drive at 808. Otherwise, the operating system continues to poll the hard disk drive at 804. The methodology 800 completes at 810.

Figure 9:
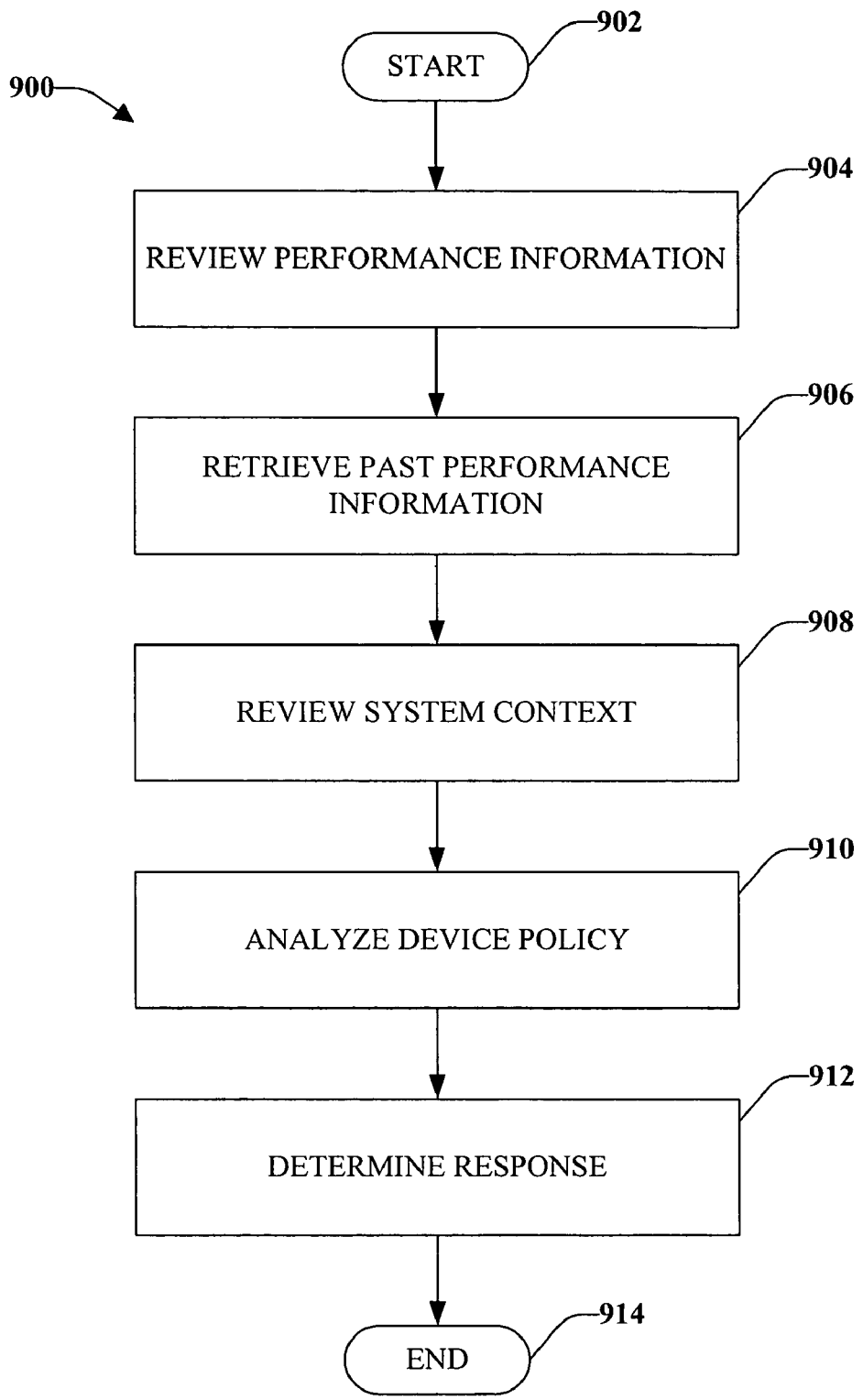
FIG. 9 is a representative flow diagram of a methodology for determining operating system response to hard disk drive performance conditions.

Turning now to FIG. 9, a methodology 900 for determining an operating system response to a notification (and/or detailed performance conditions) based upon predefined policy is illustrated. The methodology starts at 902, and at 904 the hard disk drive reviews performance information associated therewith. At 906, the hard disk drive reviews past performance information with respect to the hard disk drive from a data storage unit, which can be memory, within the hard disk drive, externally stored (e.g., upon an accessible server), and/or other suitable locations. For example, the data storage unit can include historic performance data relating to a single hard disk drive or multiple hard disk drives. The past performance information can be used to determine a proper response to current hard disk drive performance conditions. For example, isolated instances of slightly elevated temperatures or duty cycles may not necessitate an immediate action. Prolonged periods with elevated temperatures or duty cycles, however, may damage the hard disk drive and an immediate response may be appropriate.

At 908, system context can be reviewed in connection with selecting an appropriate reaction to hard disk drive performance conditions. The system context may include system configuration information as well as current system status. System configuration may affect the selection of an appropriate response to hard disk drive performance conditions. If the hard disk drive is experiencing excessive duty cycles in a personal computer, for example, the appropriate reaction may be to temporarily prevent a user from accessing the hard disk drive. For a hard disk drive connected to a network server, the appropriate response to excessive duty cycles may be network load balancing. As used herein, load balancing means distributing the data and processing evenly across system resources to prevent overloading any single device. The system status may also affect selection of an action or policy provided to the operating system. For example, the hard disk drive may request that the operating system shut down such hard disk drive when it is registering an excessive temperature reading at 4 a.m. when there are no or a small number of users logged into the system. However, the hard disk drive may determine different actions or policies if the excessive temperature occurs at 10 a.m. on a Monday when a large number of users are logged in to the network server.

At 910, the hard disk drive analyzes device policy, performance data, contextual data, and the like to determine an action to be taken by the operating system. The device policy may contain a set of rules and/or guidelines for determining operating system responses. The operating system can include a graphical user interface (GUI) to assist users and system administrators in creating, updating or modifying the device policy. Similarly, the operating system can include a wizard to aid users in defining device policies. Operating systems connected to multiple hard disk drives may utilize multiple device policies.

At 912, the operating system implements the actions determined by the hard disk drive. As described previously, type of action determined by the hard disk drive can be based upon multiple factors including the type and severity of the conditions experienced by the hard disk drive, the current system context, the past performance conditions of the hard disk drive and/or the device policy. The hard disk drive can determine the appropriate action based upon any combination of these factors as well as any other relevant information. Furthermore, the determined action(s) to be undertaken by the operating system can be based at least in part upon nature and severity of the performance conditions. For example, if the performance information indicates that the hard disk drive is experiencing a high duty cycle, the action may be continued monitoring the situation. If the increase in duty cycle is temporary, no action may be necessary. However, if the performance information includes an increase in error rates indicating that a hard disk drive failure is likely, the hard disk drive can determine that the operating system should inform users and perhaps copy critical data to another storage medium. Similarly, determined action can be different based upon magnitude of the performance condition. For example, if the drive temperature is slightly outside of normal operating parameters the hard disk drive can determine that the operating system should monitor the hard disk drive. However, if the temperature far exceeds normal operating parameters, the hard disk drive can determine that the operating system should alert users and in an extreme case, where hard disk drive failure is imminent, the operating system should shut down the hard disk drive. These actions can be undertaken by the operating system upon receipt of such actions from the hard disk drive. The methodology 900 completes at 914.

Figure 10:
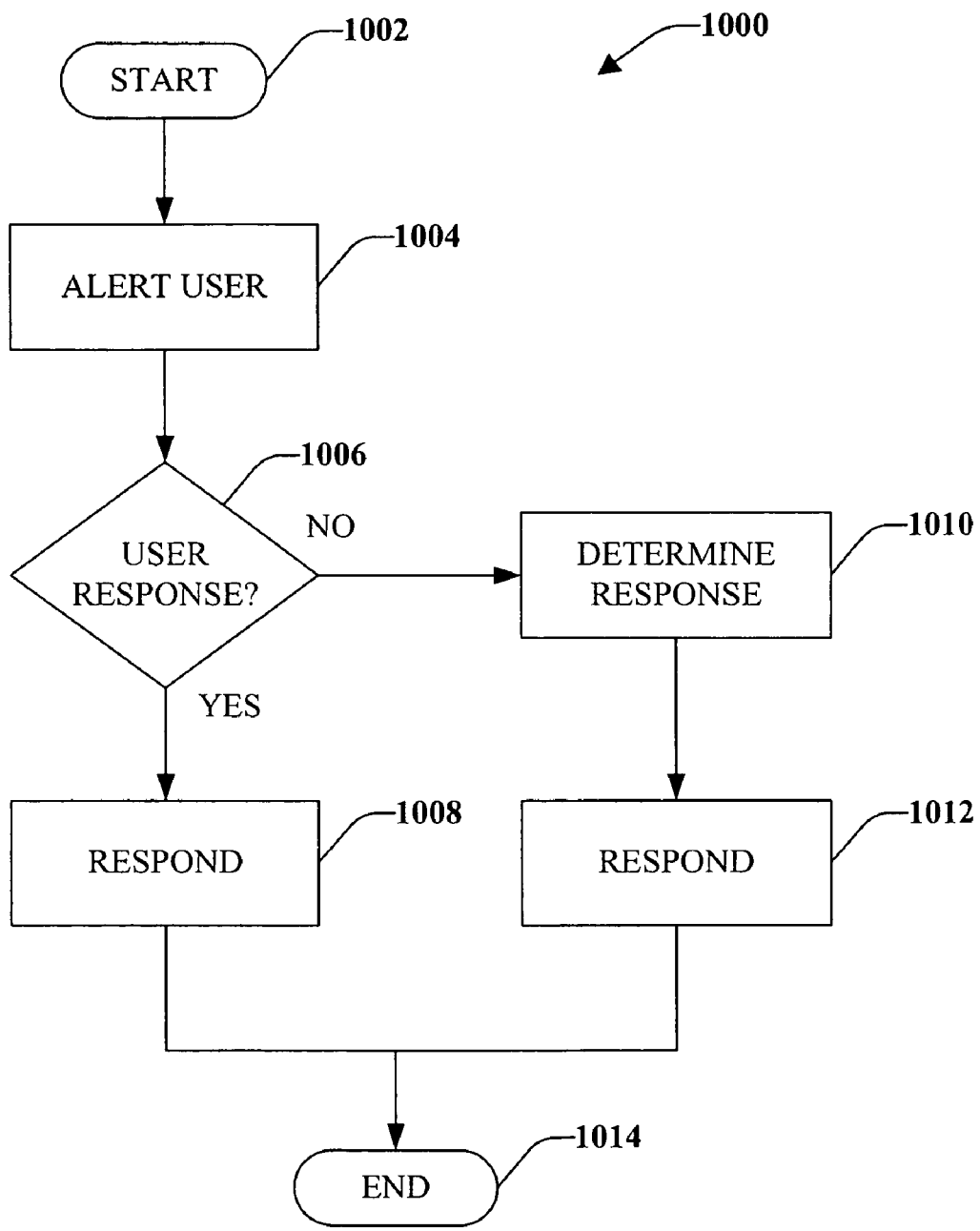
FIG. 10 is a representative flow diagram of a methodology for alerting a user to a performance condition of a hard disk drive.

Turning now to FIG. 10, a methodology 1000 for determining an appropriate corrective/maintenance action is illustrated. Possible responses include load balancing, limiting access to the hard disk drive and initiating a backup or increasing frequency of hard disk drive backups. A hard disk drive can also cause an operating system to generate alert messages for users or a system administrator. The methodology 1000 begins at 1002, and at 1004 the operating system may prompt one or more users for a response to the hard disk drive conditions using emails, text messages, opening a text message window on the user's display or any other suitable method of communication. The operating system can provide the user with detailed information regarding the nature of the performance condition and prompt the user to respond. For example, the operating system can provide the user with a list of possible responses and allow the user to select an action from the list. At 1006, a determination is made regarding whether a user has responded to the alert. If the user responds and directs the operating system response, the operating system will act as directed at 1008. If the user fails to respond or is unavailable within a specified time period and the performance condition does not abate, the operating system autonomously determines a best response to the performance information at 1010. After the best response is determined, the operating system responds at 1012, and the methodology 1000 completes at 1014.

Figure 11:
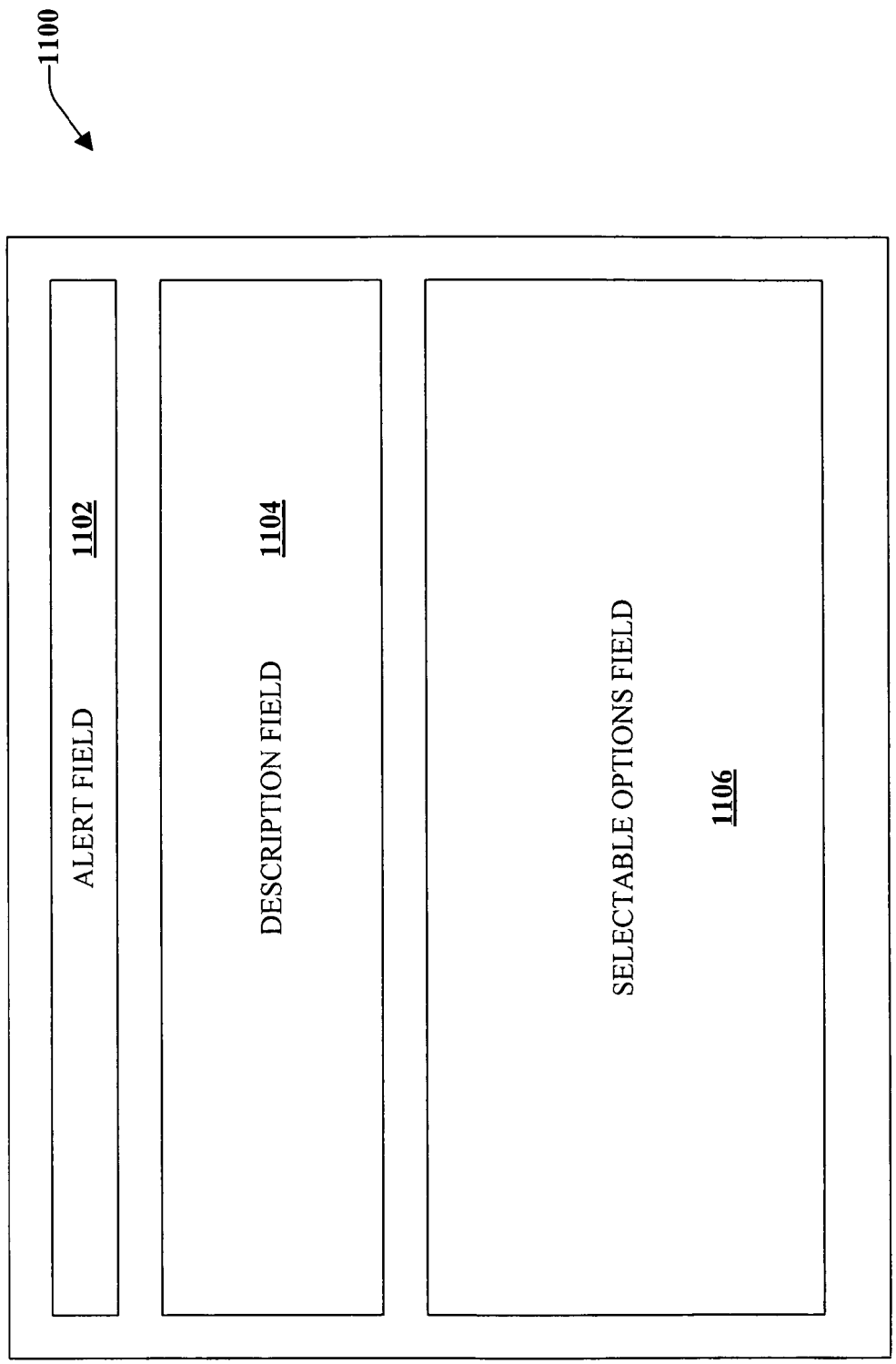
FIG. 11 is an exemplary graphical user interface that can be generated by an operating system in response to determined parameters associated with a hard disk drive.

Turning now to FIG. 11, an exemplary graphical user interface 1100 that can be employed to provide a user with information and options relating to a performance condition associated with a hard disk drive is illustrated. The graphical user interface 1100 can be presented upon receipt of an action from the hard disk drive, wherein the action relates to warning a user of possible failure of a hard disk drive. The graphical user interface 1100 can include a plurality of disparate fields, including an alert field 1102 that is designed to attract the user's attention as to the existence of a problematic issue with the hard disk drive. For instance, the alert field 1102 can include a graphical symbol, such as a brightly colored exclamation point, to notify a user that the graphical user interface 1100 includes important information. The alert field 1102 can further include a short summary that indicates a nature of the problem, such as "hard disk drive temperature is outside acceptable bounds."

The graphical user interface 1100 can further include a description field 1104 that more fully describes a nature of an issue with the hard disk drive. For example, the description field can include a succinct description of the issue, possible causes of the issue, history of the hard disk drive with respect to the issue, and consequences of not undertaking action. The graphical user interface can additionally comprise a selectable options field 1106 that provides different options to the user relating to the cause of the alert. For example, the selectable options field 1106 can include one or more radio buttons, selectable icons, pull-down menus, and the like. The options can include suggested actions by the operating system under particular circumstances, wherein such actions may be arranged according to desirable outcome. For instance, through self-monitoring, a hard disk drive may determine that powering down a computer is a best option, and therefore such option can be listed first within the selectable options field 1106. A next best option may be backing up at least a portion of the hard disk drive, and that option can be listed below the best option. An option to ignore the warning can also be provided, and upon selection of such option additional warnings may be provided to the user.

Figure 12:
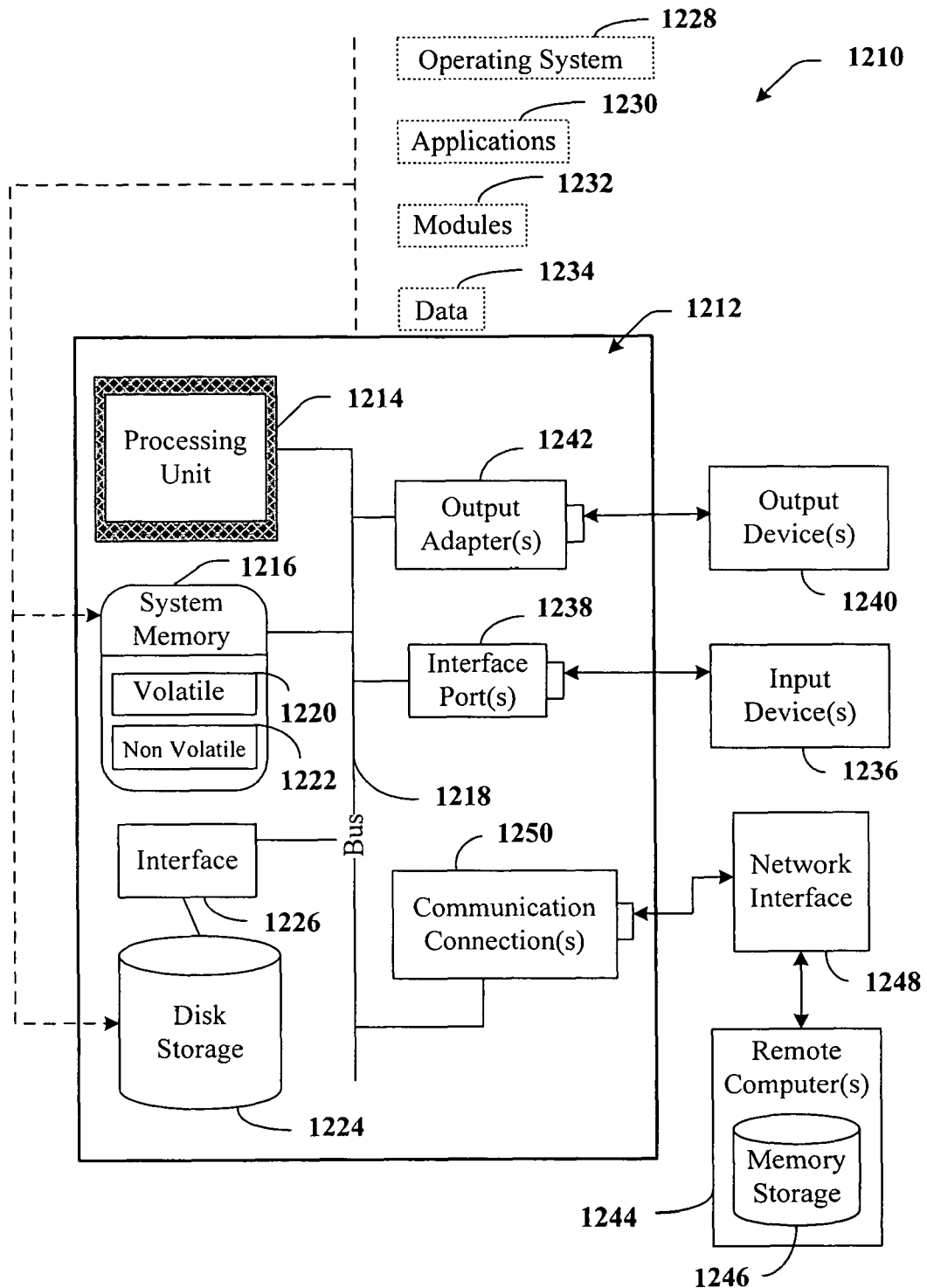
FIG. 12 illustrates a suitable computing environment for reporting and correcting hard disk drive performance conditions.

In order to provide additional context for various aspects of the subject invention, FIG. 12 and the following discussion are intended to provide a brief, general description of a suitable operating environment 1210 in which various aspects of the claimed subject matter may be implemented. While the claimed subject matter is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the features described herein. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 that can be employed in connection with maintaining and/or updating a hard disk drive includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI). The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). For instance, a DVD-ROM drive can be employed in connection with reading video content from a DVD. To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228, which can operate in response to actions determined by a hard disk drive as described above. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, remote control, and the like. These devices can be employed by users to select an action to be undertaken by an operating system with respect to a hard disk drive. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
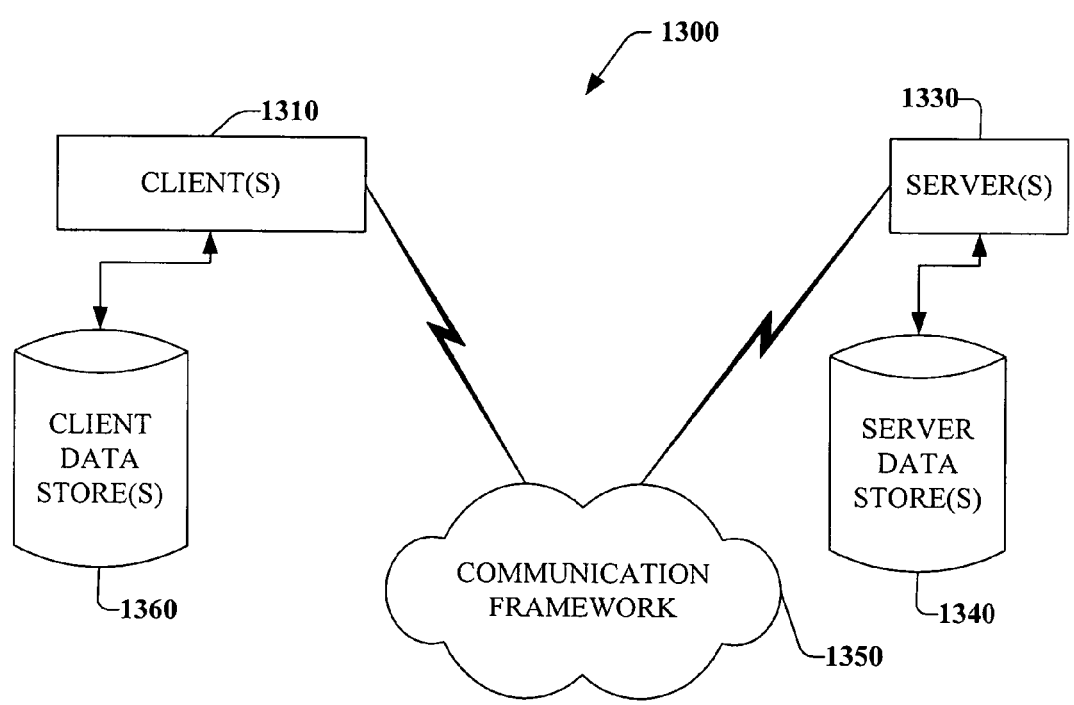
FIG. 13 illustrates an operational environment for a system for reporting and correcting hard disk drive performance conditions.

FIG. 13 is a schematic block diagram of a sample-computing environment 1300 with which the claimed subject matter can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the claimed subject matter, for example. One possible communication between a client 1310 and a server 1330 can be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330. In particular examples, operating systems associated with the client(s) 1310 can be employed to monitor and undertake actions with respect to hard disk drives associated with the server(s) 1330. Similarly, operating systems associated with the server(s) 1330 can be employed to monitor and undertake actions with respect to hard disk drives associated with the client(s).

What has been described above includes examples of the claimed subject matter. It is, of course, not possible to describe every conceivable combination of components or methodologies for purposes of describing such subject matter, but one of ordinary skill in the art may recognize that many further combinations and permutations are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer comprising:
    an operating system;
    a hard disk drive having a sensor to measure a physical operating parameter of the hard disk drive, the hard disk drive configured to compare the physical operating parameter to an expected range of said physical operating parameter and send a notification when the physical operating parameter is determined to be out of the expected range, the expected range being a range of said physical operating parameter in which the hard disk drive is expected to operate without damaging the hard disk drive;
    a memory component comprising extensions to at least one protocol associated with the hard disk drive, the extensions enabling communications relating to disk drive diagnostics to occur between the operating system and the hard disk drive;
    an interface component that utilizes the extensions to receive the notification from the hard disk drive and relay the notification to the operating system, the notification relating to the physical operating parameter of the hard disk drive determined to be out of the expected range; and
    a processor operating under control of the operating system for sending a command to the hard disk drive via the interface component in response to receiving the notification, the command instructing the hard disk drive to send an action to the processor, the action being determined by the hard disk drive in response to the physical operating parameter being outside of the expected range and based at least in part on the physical operating parameter, the action being a corrective/maintenance action related to the hard drive.

2. The computer of claim 1, wherein the hard disk drive comprises a policy component that analyzes the physical operating parameter measured by the sensor and historic performance data of the hard disk drive in connection with determining the at least one action.

3. The computer of claim 2, wherein the operating system further comprises a prioritization component that further determines the action based on a current activity of the operating system, wherein the processor is further configured to perform the action.

4. The computer of claim 1, wherein the sensor of the hard disk drive is configured to measure at least one of temperature, vibration, G force, read speed, write speed, power on time, error rate, power on frequency, and duty cycle information.

5. The computer of claim 1, wherein the operating system comprises a polling component that polls the hard disk drive for the notification, the notification delivered to the operating system upon detection of the notification by the polling component.

6. The computer of claim 1, wherein the at least one protocol is selected from the group consisting of a small computer system interface (SCSI), serial attached SCSI (SAS), parallel ATA (PATA), and serial ATA (SATA) protocol.

7. The computer of claim 1, wherein the hard disk drive comprises a reminder component that resends the notification after a threshold amount of time passes without response from the operating system.

8. The computer of claim 1, wherein the operating system further comprises a presentation component that presents information relating to the notification to a user.

9. The computer of claim 8, wherein the presentation component creates an email and delivers such email to an account associated with the user.

10. The computer of claim 3, wherein the action comprises at least one of powering off the hard disk drive, performing load balancing, and initiating backup of the hard disk.

11. The computer of claim 1, further comprising a data store component that includes historical performance information relating to the hard disk drive, and the notification is based at least in part upon an analysis of the historical performance information.

12. A method for maintaining hard disk drive performance comprising acts of:
with an operating system of a computer having a hard disk drive:
receiving a diagnostic error notification from the hard disk drive by way of a protocol extension associated with the hard disk drive, the diagnostic error notification based at least in part upon an environmental parameter relating to the hard disk drive, the diagnostic error notification indicating the environmental parameter is outside of an expected range, wherein the expected range is a range of said environmental parameter in which the hard disk drive is expected to operate without damage to the hard disk drive, wherein the expected range of the environmental parameter is defined by at least one threshold;
responding to the diagnostic error notification by sending at least one command to the hard disk drive, the command requesting an action determined by the hard disk drive, the action determined in response to the environmental parameter being outside of the expected range, and the action correcting a sensed problem with the hard disk drive or mitigating damage to the hard disk drive;
after sending the at least one command to the hard disk drive, receiving from the hard disk drive an indication of the action to be performed; and
controlling performance of the action indicated by the hard disk drive.

13. The method of claim 12, further comprising configuring the operating system to poll the hard disk drive for the diagnostic error notification.

14. The method of claim 12, wherein the diagnostic error notification is based at least in part upon the operating parameter sensed by at least one sensor.

15. The method of claim 12, further comprising generating a user notification in response to the diagnostic error notification, the user notification comprising at least one of a warning and selectable actions to a user of the hard disk drive.

16. The method of claim 12, further comprising reminding the operating system of the diagnostic error notification if the operating system has not responded to the diagnostic error notification after passage of a threshold amount of time.

17. A computer-readable storage device having computer usable instructions stored thereon for execution by a processor to perform a method comprising acts of:
at an operating system, receiving a diagnostic error notification from a hard disk drive, the diagnostic error notification indicating a physical operating parameter of the hard disk drive is outside of an expected ranged, the expected range defined by at least one threshold;
responding to the diagnostic error notification by the operating system by sending at least one command to the hard disk drive, the command requesting an action determined by the hard disk drive the action determined in response to the physical operating parameter being outside of the expected range;
after sending the at least one command from the operating system, receiving from the hard disk drive an indication of the action to be performed; and
performing the action by the operating system, the action correcting a sensed problem with the hard disk drive or mitigating damage to the hard disk drive.

18. The computer-readable storage device of claim 17, wherein the act of receiving the diagnostic error notification indicates a temperature sensed in the hard disk drive exceeds a threshold temperature for a safe operating environment of the hard disk drive.

19. The computer of claim 1, wherein:
the sensor is a temperature sensor;
the physical operating parameter is a temperature;
the expected range is of the temperature is defined by a threshold temperature; and
the notification from the hard disk drive received by the interface component indicates that a temperature sensed by the temperature sensor of the hard disk drive exceeds the threshold temperature for safely operating the hard disk drive.

20. The computer of claim 1, wherein the physical operating parameter is a duty cycle of operation of the hard disk drive, and the expected range of said duty cycle is defined by at least an upper limit.

* * * * *